United States Patent
Omori et al.

(10) Patent No.: US 7,192,018 B2
(45) Date of Patent: Mar. 20, 2007

(54) TILTABLE-ROTATABLE CIRCULAR-TABLE DEVICE FOR MACHINE TOOL

(75) Inventors: Mitsuru Omori, Kanazawa (JP); Haruo Osaki, Kanazawa (JP)

(73) Assignee: Tsudakoma Kogyo Kabushiki Kaisha, Kanazawa (JP)

( * ) Notice: Subject to any disclaimer, the term of this patent is extended or adjusted under 35 U.S.C. 154(b) by 77 days.

(21) Appl. No.: 11/071,268

(22) Filed: Mar. 4, 2005

(65) Prior Publication Data

US 2005/0212193 A1   Sep. 29, 2005

(30) Foreign Application Priority Data

Mar. 29, 2004 (JP) .............................. 2004-094739

(51) Int. Cl.
*B23Q 1/25* (2006.01)
(52) U.S. Cl. ......................................... 269/71; 269/131
(58) Field of Classification Search ................. 269/71, 269/289 R, 131, 73
See application file for complete search history.

(56) References Cited

U.S. PATENT DOCUMENTS

| 4,294,440 | A | * | 10/1981 | Severt | 269/71 |
| 4,373,324 | A |   | 2/1983  | Janos  | 59/78.1 |
| 4,600,817 | A |   | 7/1986  | Hackenberg | 191/12 C |
| 5,589,773 | A | * | 12/1996 | Berger et al. | 324/261 |
| 6,374,589 | B1 |  | 4/2002  | Kunert et al. | 59/78.1 |
| 2005/0212193 | A1 | * | 9/2005 | Omori et al. | 269/71 |

FOREIGN PATENT DOCUMENTS

JP   2002-273630   9/2002

* cited by examiner

*Primary Examiner*—Lee D. Wilson
(74) *Attorney, Agent, or Firm*—Armstrong, Kratz, Quintos, Hanson & Brooks, LLP

(57) ABSTRACT

A tiltable-rotatable circular-table device for a machine tool includes a rotary-driving motor which is fixed to a tiltable table and is for rotating a circular table disposed above the tiltable table; a motor cover which is fixed to the main frame and is for housing the rotary-driving motor; and cables connected with the rotary-driving motor. The tiltable-rotatable circular-table device further includes a cable guide whose one end is fixed to the motor cover and the other end is fixed on a periphery of the rotary-driving motor. The cable guide is housed in the motor cover and is capable of surrounding at least a portion of the periphery of the rotary-driving motor so as to guide the cables in a direction in which the cables extend. The cable guide is bendable mainly in its thickness direction at multiple sections thereof such that the cable guide is capable of surrounding the rotary-driving motor.

3 Claims, 4 Drawing Sheets ize of the cover.

TILTABLE-ROTATABLE CIRCULAR-TABLE DEVICE FOR MACHINE TOOL

BACKGROUND OF THE INVENTION

1. Field of the Invention

The present invention relates to tiltable-rotatable circular-table devices used as attachment devices for machine tools. In particular, the present invention relates to a tiltable-rotatable circular-table device including a main frame; a tiltable table having tilting shafts via which the tiltable table is axially supported on the main frame; a circular table rotatably disposed on the tiltable table; a tilt-driving motor which is disposed in the main frame and is provided for tilting the tiltable table via the tilting shafts; a rotary-driving motor which is fixed to the tiltable table and is provided for rotating the circular table; a motor cover which is fixed to the main frame and is provided for housing the rotary-driving motor; and cables connected with the rotary-driving motor.

2. Description of the Related Art

In a typical tiltable-rotatable circular-table device, when a workpiece is loaded onto a machine tool so as to be processed on the circular table, the circular table is rotated to a desired angle in order to index the rotational angle of the workpiece. Moreover, the tiltable table supporting the circular table is tilted by rotating the tilting-shafts, which axially support the tiltable table, in order to index the tilting angle of the workpiece. The rotation of the circular table to a desired angle is performed by the rotary-driving motor linked with the circular table via, for example, gears. On the other hand, the tilting of the tiltable table, i.e. the rotation of the tiltable table about the tilting shafts, is performed by the tilt-driving motor linked with the tilting shafts via, for example, gears provided in the main frame.

In such a typical tiltable-rotatable circular-table device, the circular table and the rotary-driving motor are mechanically linked with each other. For this reason, like the circular table, the rotary-driving motor is also supported by the tiltable table and is axially aligned with the tilting shafts of the tiltable table. Consequently, when the tiltable table is rotated about the tilting shafts so as to tilt the tiltable table, the rotary-driving motor is concurrently rotated about the same axis. In this case, cables, for example, which are connected with the rotary-driving motor to supply power to the rotary-driving motor, are also rotated with the rotary-driving motor about the same axis, and are thus thrown around in a disorderly manner around the rotary-driving motor. This is problematic in that the cables may hit the peripheral devices and units, causing the cables or the peripheral devices to break.

Japanese Unexamined Patent Application Publication No. 2002-273630 (claims, etc.) discloses a tiltable-rotatable circular-table device for solving such a problem. According to this tiltable-rotatable circular-table device, a motor, which rotates concurrently with the tilting of a table, and cables connected to the motor are housed inside a cover fixed to a main frame. Moreover, the cover also houses a belt-like resiliently-deformable cable-guide along which the cables are disposed. One end of the cable guide is fixed to the cover, and the cable guide itself can be expanded and retracted in response to the rotation of the motor. Furthermore, according to such a tiltable-rotatable circular-table device, since the movement of the cables around the motor in response to the rotation of the motor takes place strictly inside the cover, the cables are prevented from coming into contact with, for example, peripheral units. Moreover, the constant movement of the cables due to the cable guide prevents the cables from, for example, wearing and bending in the cover. Accordingly, this prevents the cables from, for example, breaking when moving inside the cover without having to increase the size of the cover.

According to the tiltable-rotatable circular-table device of Japanese Unexamined Patent Application Publication No. 2002-273630, the cable guide is formed of a resiliently-deformable belt-like plate, and such a plate can be deformed into a substantially cylindrical shape that can wrap around the periphery of the motor. Moreover, the resiliently-deformable plate can be deformed in a manner such that the diameter of the cylinder can be expanded and retracted in response to the rotation of the motor. In other words, when the motor is rotating, the diameter of the cylinder formed by the resiliently-deformable plate can be retracted against the resilient force of the plate or can be expanded with the restoring force of the plate.

According to such a cable guide, the resiliently-deformable plate is frequently deformed against its resilient force in a repetitive manner for every index operation of the tilting angle of a workpiece, i.e. every rotation of the tiltable table. For this reason, the plate is easily deteriorated and cannot be used for an extended period of time. This is problematic in view of the durability of the cable guide. Moreover, since such deterioration may lead to a lower resilient force and restoring force of the plate, the expansion and retraction of the diameter of the cylindrical plate cannot properly respond to the rotation of the motor. This may cause the plate to bend, such that the cable guide cannot properly fulfill its function. In the long run, this may cause the cables to break.

Furthermore, in such a cable guide, when the tiltable table is to be rotated in a direction in which the cables wrap around the periphery of the motor, the tilt-driving motor must rotate the tiltable table against the resilient force of the cable guide. This increases the load applied to the tilt-driving motor and a drive-transmission mechanism for the motor including, for example, gears, and may thus cause these elements to break at an earlier stage.

SUMMARY OF THE INVENTION

Accordingly, it is an object of the present invention to solve the problems mentioned above by providing a tiltable-rotatable circular-table device having a cable-distribution structure that prevents a cable guide from deteriorating at an early stage and reduces a load applied to a tilt-driving motor and a drive-transmission mechanism for the motor even if a tiltable table is repetitively rotated for indexing the tilting angle of a workpiece.

In order to achieve the object mentioned above, the present invention provides a tiltable-rotatable circular-table device for a machine tool, which includes a main frame; a tiltable table having tilting shafts via which the tiltable table is axially supported on the main frame; a circular table rotatably disposed on the tiltable table; a tilt-driving motor which is disposed in the main frame and is provided for tilting the tiltable table via the tilting shafts; a rotary-driving motor which is fixed to the tiltable table and is provided for rotating the circular table; a motor cover which is fixed to the main frame and is provided for housing the rotary-driving motor; and cables connected with the rotary-driving motor. Such a tiltable-rotatable circular-table device further includes a cable guide which is housed in the motor cover and is capable of surrounding at least a portion of a periphery of the rotary-driving motor so as to guide the cables in a direction in which the cables extend, one end of the cable guide being fixed to the motor cover, the other end of the cable guide being fixed on the periphery of the rotary-driving motor. The cable guide is bendable mainly in its thickness direction at multiple sections thereof such that the cable guide is capable of surrounding the rotary-driving motor.

The expression "the other end of the cable guide being fixed on the periphery of the rotary-driving motor" implies that the positional relationship between the other end of the cable guide and its corresponding position on the periphery of the rotary-driving motor does not change even when the rotary-driving motor is rotated in response to the rotation of the tiltable table. In detail, the other end of the cable guide may be directly fixed on the periphery of the motor or may be fixed on the periphery of the motor via a component which rotates with the motor.

Furthermore, the expression "the cable guide is bendable mainly in its thickness direction at multiple sections thereof such that the cable guide is capable of surrounding the rotary-driving motor" implies that, even if the cable guide is intended to be bendable only in one direction, the cable guide may also be bendable in the opposite direction due to having an elongated structure. In other words, the cable guide may also be bendable in an originally-unintended direction, or be bendable in the opposite direction by an extremely small amount in comparison with the originally-intended direction. Moreover, regarding the bending direction of the cable guide, the cable guide is bendable mainly in its thickness direction, and may be bendable or unbendable in the width direction.

Furthermore, the cable guide according to the tiltable-rotatable circular-table device of the present invention preferably includes a plurality of guide components rotatably linked with each other, and each of the guide components is preferably rotatable with respect to one of its two adjacent guide components in one direction from a linearly-linked state.

Furthermore, each guide component is preferably provided with a plurality of separated internal spaces through which the cables extend.

According to the tiltable-rotatable circular-table device of the present invention, the cable guide is bendable in the direction for surrounding the rotary-driving motor, that is, the direction for wrapping around the periphery of the rotary-driving motor, but is scarcely bendable in the opposite direction. Thus, when the rotary-driving motor is rotated in the direction for winding the cables in response to the rotation of the tiltable table, the cable guide can be readily wrapped around the periphery of the rotary-driving motor. In contrast, when the rotary-driving motor is rotated in the direction for unwinding the cables, the wound portion of the cable guide moves away from the periphery of the rotary-driving motor in a substantially linear manner or in a manner such that the cable guide forms a large circular-arc. Either in a linear manner or a circular-arc manner, the cable guide becomes substantially U-shaped. Because the cable guide performs constant movement inside the motor cover between the wrapped state around the periphery of the rotary-driving motor and the U-shaped state, as the rotary-driving motor rotates in response to the rotation of the tiltable table, the cables are guided within the range of the constant movement of the cable guide. Accordingly, this prevents the cables from, for example, breaking without having to increase the size of the motor cover.

Furthermore, because the wound portion of the cable guide around the periphery of the rotary-driving motor moves away from the motor in a substantially linear manner or a substantially arc-like manner when the motor is rotated in the direction for unwinding the cables, the cables are prevented from breaking due to repetitive bending.

Furthermore, because the cable guide according to the present invention is bendable in the direction for surrounding the rotary-driving motor, even when the tiltable table is rotated such that the rotary-driving motor is rotated in the direction for winding the cables, the load applied to, for example, the tilt-driving motor in response to the deformation of the cable guide is extremely small. Consequently, this prevents the tilt-driving motor and a drive-transmission mechanism for the motor from breaking at an early stage. Moreover, since the bending properties of the cable guide according to the present invention are not based on a resilient force of a resilient material, the durability of the cable guide of the present invention is significantly improved in comparison with that of a conventional cable guide.

DESCRIPTION OF THE PREFERRED EMBODIMENTS

Embodiments of the present invention will now be described with reference to the drawings.

Figure 1:
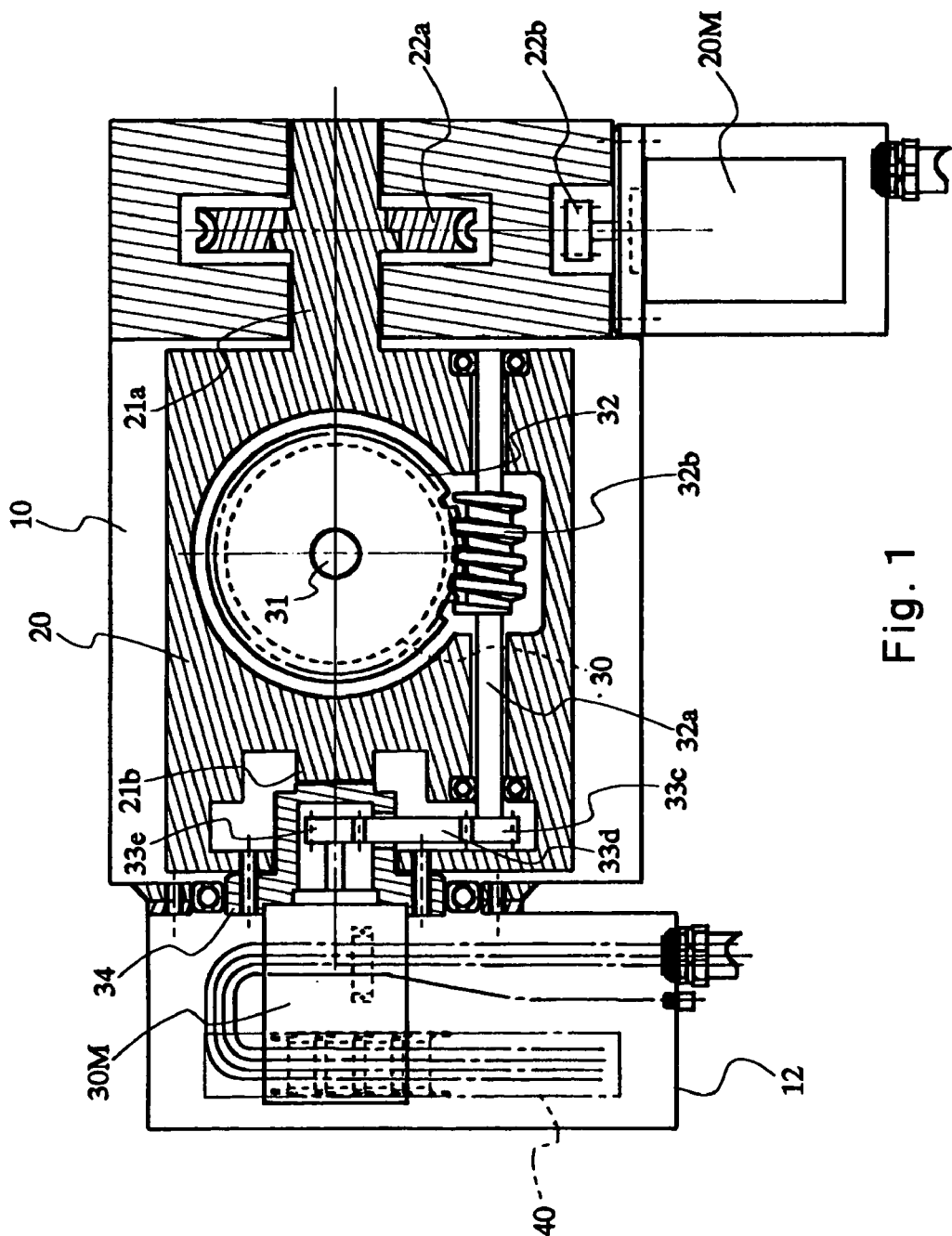
FIG. 1 includes a plan view and a partial cross-sectional view of a tiltable-rotatable circular-table device to which the present invention is applied.
Figure 2:
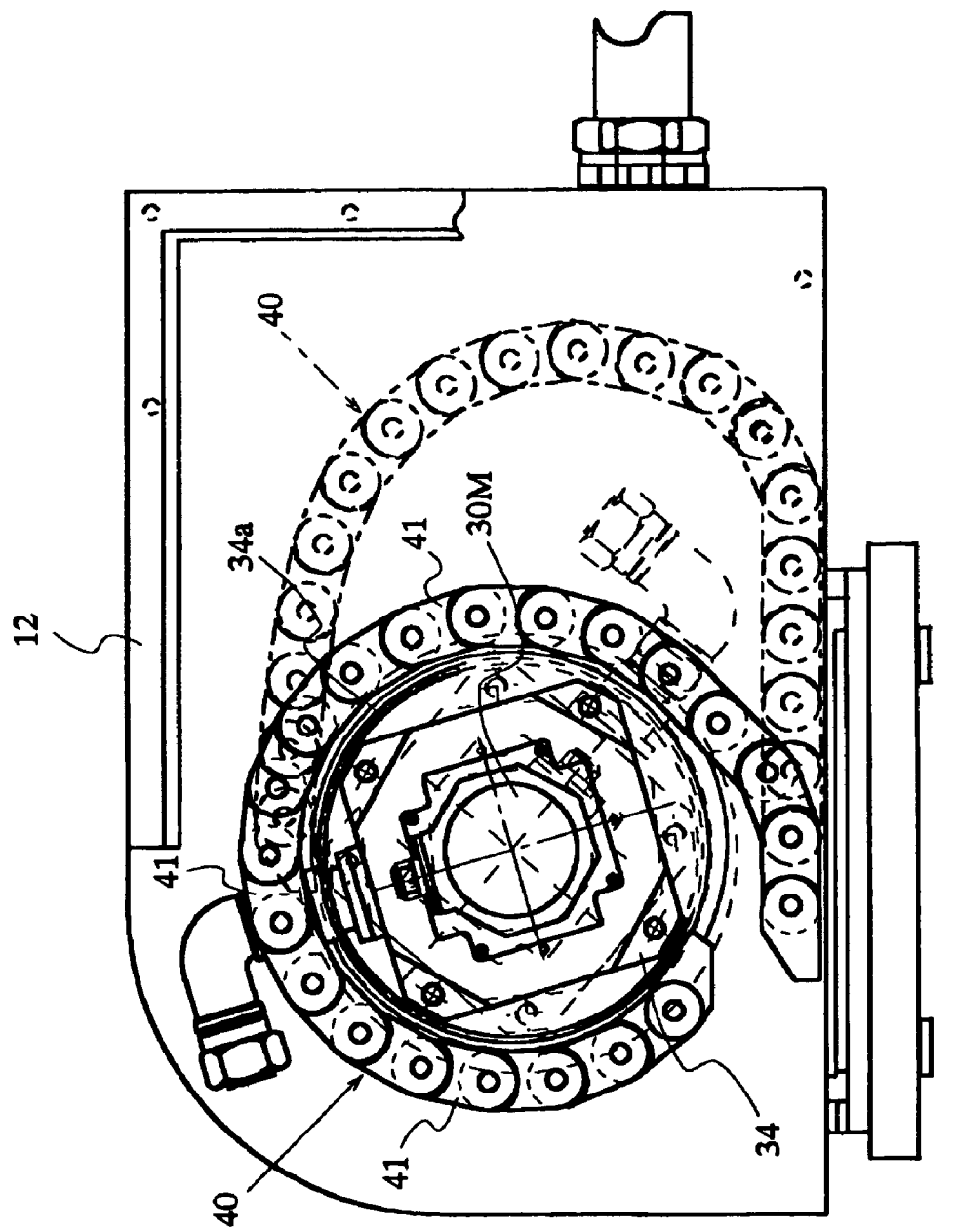
FIG. 2 is a side view illustrating relevant elements according to an embodiment of the present invention.
Figure 3:
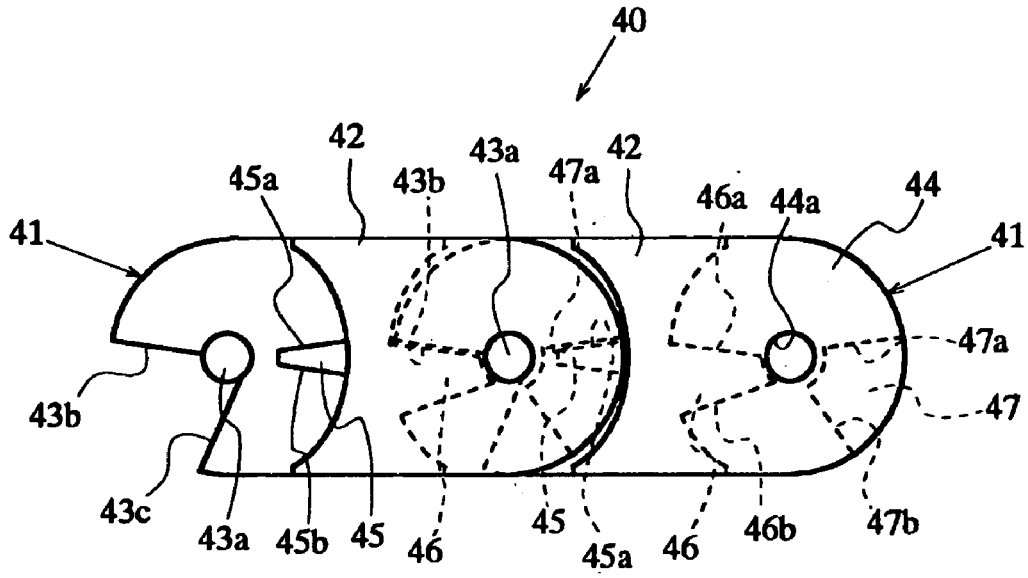
FIGS. 3A and 3B are side views each illustrating a section of a cable guide according to the embodiment of the present invention.
Figure 3:
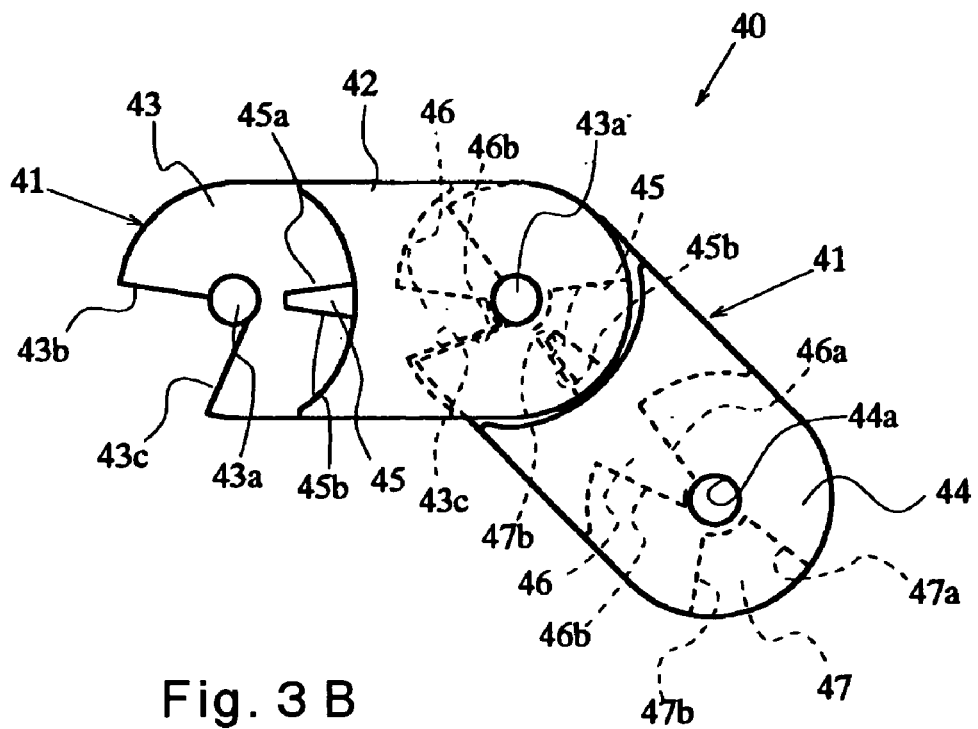
Figure 4:
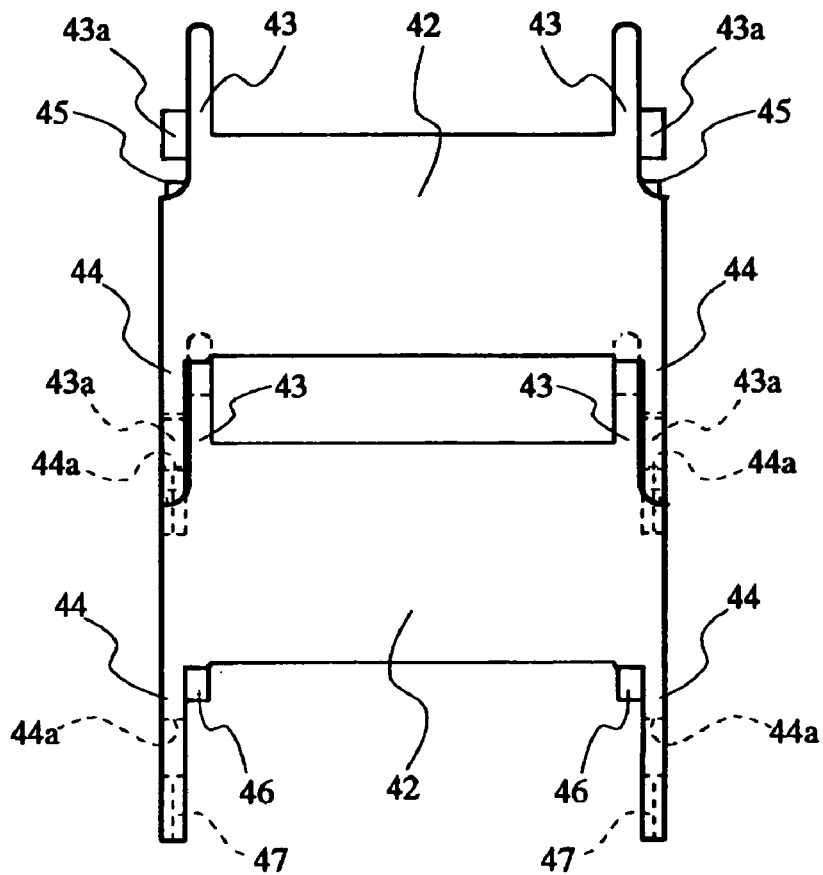
FIG. 4 is a plan view illustrating a section of the cable guide according to the embodiment of the present invention.

FIGS. 1 and 2 illustrate an embodiment of the present invention. Referring to FIG. 1, a tiltable-rotatable circular-table device mainly includes a main frame 10; a tiltable table 20; a circular table 30; a tilt-driving motor 20M; and a rotary-driving motor 30M.

The tiltable table 20 is provided with tiltable shafts 21a and 21b protruding from opposite sides of the tiltable table 20. The tiltable table 20 is rotatably supported by the main frame 10 with, for example, shaft bearings via the tiltable shafts 21a and 21b. Furthermore, the tiltable shaft 21a is provided with a worm wheel 22a, which is a part of a first drive-transmission mechanism for transmitting a driving force of the tilt-driving motor 20M to the tiltable table 20.

The tilt-driving motor 20M is securely disposed in the main frame 10. A gear 22b is fixed to an output shaft of the tilt-driving motor 20M. The gear 22b and the worm wheel 22a are linked with each other via the first drive-transmission mechanism including, for example, a gear, a worm shaft, and a worm, which are not shown in the drawings. Such a mechanism transmits a rotation of the output shaft of the tilt-driving motor 20M to the tiltable table 20 such that the tiltable table 20 rotates with respect to the tiltable shafts 21a and 21b. Thus, the tilting angle of the tiltable table 20 can be adjustably indexed to any desired angle.

The tiltable table 20 supports a central shaft 31 which acts as a center of rotation for the circular table 30. The central shaft 31 supports a worm wheel 32 provided for rotating the circular table 30. Regarding the positional relationship among the circular table 30, the central shaft 31, and the worm wheel 32, the circular table 30 and the worm wheel 32 may be fixed to the central shaft 31, or the circular table 30 may be rotatably supported by the central shaft 31 while the worm wheel 32 is fixed to the circular table 30.

Furthermore, the tiltable table 20 is linked with the rotary-driving motor 30M for rotating the circular table 30 via a bracket 34. The rotary-driving motor 30M and the worm wheel 32 are linked with each other via a second drive-transmission mechanism. The second drive-transmission mechanism has, for example, the structure shown in FIG. 1 and includes a worm shaft 32a which is rotatably supported by the tiltable table 20 via shaft bearings; a worm 32b which is fixed to the worm shaft 32a and meshes with the worm wheel 32; a gear 33c fixed to one end of the worm shaft 32a; and a gear 33e which is fixed to an output shaft of the rotary-driving motor 30M and is linked with the gear 33c via a gear 33d. Consequently, the second drive-transmission mechanism transmits the rotation of the rotary-driving motor 30M to the worm wheel 32 so that the rotational angle of the circular table 30 can be adjustably indexed to any desired angle.

As described above, the circular table 30 and the worm wheel 32 are supported by the tiltable table 20 via the central shaft 31, and moreover, the rotary-driving motor 30M mechanically linked with the circular table 30 and the worm wheel 32 via the second drive-transmission mechanism is also supported by the tiltable table 20. Furthermore, the rotary-driving motor 30M is axially aligned with the tiltable shafts 21a and 21b of the tiltable table 20. Accordingly, this means that when the tiltable table 20 is rotated with respect to the tiltable shafts 21a and 21b so as to index the tilting angle, the rotary-driving motor 30M is concurrently rotated about the central axis extending through the tiltable shafts 21a and 21b.

The main frame 10 has a motor cover 12 for housing the rotary-driving motor 30M. The motor cover 12 housing the rotary-driving motor 30M contains, for example, a plurality of cables extending from the outside of the motor cover 12. Such a plurality of cables may be, for example, power cables for supplying power to the rotary-driving motor 30M. Alternatively, the tiltable-rotatable circular-table device is provided with a clamping mechanism which operates with fluid pressure and is for maintaining the position of the circular table 30 after the rotational angle of the circular table 30 is indexed, and in this case, the plurality of cables may be, for example, fluid-supplying pipes for supplying working fluid, such as air, to the clamping mechanism.

Referring to FIG. 2, the tiltable-rotatable circular-table device according to the present invention is provided with a bendable cable guide 40 housed in the motor cover 12. The cable guide 40 is for guiding the power-supplying cables for the rotary-driving motor 30M and is bendable mainly in one direction at multiple sections of the cable guide 40. Such a direction corresponds to the thickness direction of the cable guide 40.

One end of the cable guide 40 is fixed to the motor cover 12, namely, the inner bottom surface of the motor cover 12. Moreover, the other end of the cable guide 40 is fixed to a cover member 34a provided for covering the rotary-driving motor 30M. The cover member 34a is attached to and supported by the bracket 34 and is rotatable together with the rotary-driving motor 30M.

Accordingly, as shown in FIG. 2, when the tiltable table 20 is rotated such that the rotary-driving motor 30M is rotated counterclockwise in FIG. 2, the bracket 34 and the cover member 34a are rotated together with the rotary-driving motor 30M in the counterclockwise direction. Thus, the cable guide 40, as shown with solid lines in FIG. 2, is wrapped around the cover member 34a covering the rotary-driving motor 30M. On the other hand, when the tiltable table 20 is rotated such that the rotary-driving motor 30M is rotated clockwise in FIG. 2, the cable guide 40, as shown with chain lines, is released from the periphery of the rotary-driving motor 30M.

The structure of the cable guide 40 will now be described in detail with reference to FIGS. 2 to 5.

Referring to FIG. 2, the cable guide 40 includes a plurality of guide components 41. Referring to FIGS. 3A to 5, each guide component 41 includes a stay segment 42 substantially U-shaped in vertical cross-section; a first pair of linking segments 43 extending in one direction from a first side of the stay segment 42; and a second pair of linking segments 44 extending in the other direction from a second side of the stay segment 42. Moreover, referring to FIG. 4, each linking segment 43 is disposed closer towards the inner portion of the stay segment 42 in the width direction by the amount of the thickness of the corresponding linking segment 44.

Each linking segment 43 of the first pair is provided with a shaft 43a. On the other hand, each linking segment 44 of the second pair is provided with a hole 44a. Thus, adjacent guide components 41 of the cable guide 40 are rotatably linked with each other such that the holes 44a of one guide component 41 are engaged with the shafts 43a of the adjacent guide component 41.

Furthermore, referring to FIGS. 3A and 3B, each linking segment 43 of the first pair is provided with a substantially fan-shaped cut portion such that the linking segment 43 is provided with a first restriction surface 43b and a second restriction surface 43c. Moreover, referring to FIGS. 3A, 3B, and 4, each linking segment 43 is further provided with a projection 45 on its outer side surface, such that the projection 45 is projected outward in the thickness direction of the linking segment 43. The upper surface of the projection 45 in FIGS. 3A and 3B defines a third restriction surface 45a, and the lower surface of the projection 45 defines a fourth restriction surface 45b.

On the other hand, each linking segment 44 of the second pair is provided with a projection 46 on its inner side surface, such that the projection 46 is projected in the thickness direction of the linking segment 44. The upper surface of the projection 46 in FIGS. 3A and 3B defines a first stopper surface 46a corresponding to the first restriction surface 43b, and the lower surface of the projection 46 defines a second stopper surface 46b corresponding to the second restriction surface 43c. Moreover, each linking segment 44 of the second pair is further provided with a fan-shaped recess 47 recessed in the thickness direction of the linking segment 44. The upper surface, i.e. the surface facing downward, of the recess 47 defines a third stopper surface 47a corresponding to the third restriction surface 45a, and the lower surface, i.e. the surface facing upward, of the recess 47 defines a fourth stopper surface 47b corresponding to the fourth restriction surface 45b.

When the adjacent guide components 41 are aligned linearly as shown in FIG. 3A, the first restriction surface 43b of the guide component 41 on the right in FIG. 3A is in contact with the first stopper surface 46a of the guide component 41 on the left. Moreover, the third restriction surface 45a of the first guide component 41 on the right is in contact with the third stopper surface 47a of the guide component 41 on the left. Accordingly, in such a linearly-linked state shown in FIG. 3A, the guide component 41 on the right is rotatable only in one direction, namely, in the downward direction in FIG. 3A, with respect to the guide component 41 on the left.

Furthermore, in the example shown in FIGS. 3A and 3B, the rotation of the guide component 41 on the right is limited. Specifically, referring to FIG. 3B, such a limitation of rotation is due to the second restriction surface 43c of the guide component 41 on the right capable of being in contact with the second stopper surface 46b of the guide component 41 on the left, and the fourth restriction surface 45b of the guide component 41 on the right capable of being in contact with the fourth stopper surface 47b of the guide component 41 on the left.

Figure 5:
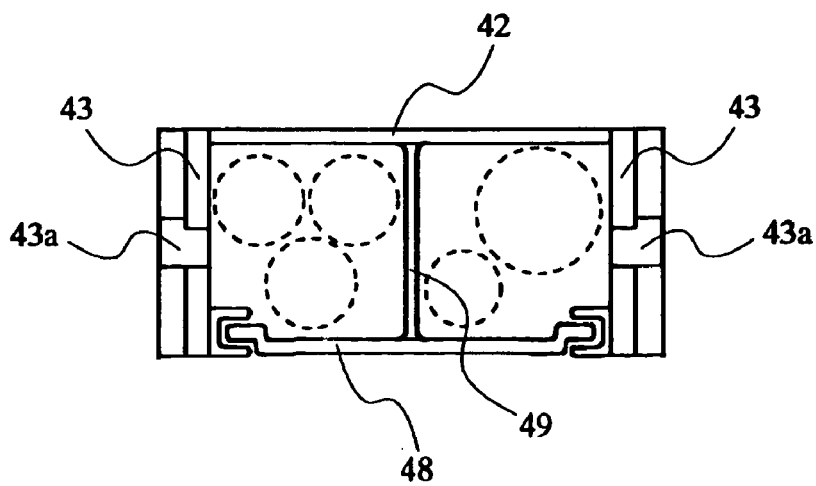
FIG. 5 is a front view illustrating a section of the cable guide according to the embodiment of the present invention.

Furthermore, referring to FIG. 5, each guide component 41 is provided with a stay 48 which is bridged between the side surfaces of the substantially U-shaped stay segment 42 and is provided for maintaining the cables inside the stay segment 42.

Accordingly, the cable guide 40 is formed of the plurality of guide components 41 that are linearly linked with one another, and each of the guide components 41 is bendable in only one direction at its linked section. Moreover, the cable guide 40 is disposed inside the motor cover 12 in a manner such that the bending direction of the cable guide 40 corresponds to the direction for wrapping around the rotary-driving motor 30M.

Thus, when the rotary-driving motor 30M, for example, is rotated clockwise from the state shown in FIG. 2 with solid lines, that is, in the state where the cable guide 40 is wrapped around the cover member 34a, a part of the cable guide 40 wrapped around the cover member 34a moves away from the cover member 34a in a substantially linear manner. The cable guide 40 thus forms a large circular-arc shape so as to become substantially U-shaped as shown in FIG. 2 with chain lines. Furthermore, if the rotary-driving motor 30M, for example, is rotated counterclockwise from the state shown with the chain lines, the cable guide 40 can readily wrap around the periphery of the cover member 34a since the cable guide 40 is bendable at multiple sections in the direction for wrapping around the rotary-driving motor 30M. Consequently, the cable guide 40 returns to the state shown with solid lines.

According to the cable guide 40 of the present invention, even when the rotary-driving motor 30M is rotated concurrently with the tilting of the tiltable table 20, the cables linked with the rotary-driving motor 30M are prevented from being thrown around in a disorderly manner and can thus be moved while forming a substantially constant trajectory. Consequently, the size of the motor cover 12 may be determined in view of the moving range of the cable guide 40, meaning that a large-sized motor cover 12 is not necessary. This prevents the overall size of the tiltable-rotatable circular-table device from increasing.

Furthermore, because the cable guide 40 does not bend more than that which is required to wrap around the periphery of the rotary-driving motor 30M, repetitive over-bending of the cables is prevented as the rotary-driving motor 30M rotates. This prevents the cables from breaking. Moreover, because the force required for deforming the cable guide 40 is extremely small, the load applied upon the tilt-driving motor 20M and the first drive-transmission mechanism is also small. This means that the durability of the tilt-driving motor 20M and the first drive-transmission mechanism is scarcely affected by such a load. Furthermore, according to the cable guide 40, since the guide components 41 themselves are not subject to, for example, any deformation, the durability of the cable guide 40 itself is high.

Referring to FIG. 5, each guide component 41 is further provided with a divider 49 extending between the upper surface of the stay segment 42 and the stay 48 so as to form two separated internal-spaces through which the plurality of cables can extend.

As described previously, the cables extending into the motor cover 12 from the outside may be, for example, power cables for supplying power to the rotary-driving motor 30M, or may be, for example, fluid-supplying pipes for supplying working fluid to the clamping mechanism of the circular table 30. If both the power cables and the pipes are used, the power cables and the pipes are both preferably guided by the cable guide 40.

However, if both the power cables and the fluid-supplying pipes are to be disposed in the same space, the power cables and the fluid-supplying pipes must be set in a manner such that they do not cross each other. This is due to the fact that if the power cables and the fluid-supplying pipes cross each other, the fluid-supplying pipes may be pressed by the power cables when, for example, the cable guide 40 is bent, and may lose the ability to transfer a sufficient amount of working fluid to the circular table 30. For this reason, if the cable guide 40 is provided with only a single internal space, the power cables and the fluid-supplying pipes must be carefully inserted into the cable guide 40 so that they do not cross each other.

On the other hand, the example shown in FIG. 5 is provided with two separated internal-spaces in the cable guide 40. According to such a structure, the fluid-supplying pipes and the power cables may be disposed in separate spaces so as to prevent the problem mentioned above. This contributes to an easier process for inserting, for example, the power cables and the fluid-supplying pipes into the cable guide 40. Moreover, even if the power cables are displaced inside the cable guide 40 due to a repetitive movement of the cable guide 40, this structure ensures that the power cables and the fluid-supplying pipes are prevented from crossing each other inside the cable guide 40.

The separated internal spaces of the cable guide 40 are not limited to two, as shown in FIG. 5, and may alternatively be three or more.

Furthermore, although the cable guide 40 is bendable only in the direction for wrapping around the rotary-driving motor 30M in the above embodiment, the cable guide 40 may alternatively be slightly bendable also in the opposite direction to a degree such that the cables do not break even with the repetitive movement of the cable guide 40.

Furthermore, the length of the cable guide 40 is preferably set such that substantially the entire cable guide 40 is bent without having any linear sections when the rotary-driving motor 30M is rotated by a maximum amount in the wrapping direction of the cable guide 40. This minimizes the moving range of the cable guide 40, and thus contributes to the size reduction of the motor cover 12.

Furthermore, the cable guide 40 of the present invention is bendable at multiple sections, and the number of such bending sections may be determined based on the wrapping condition of the cable guide 40 around the periphery of the rotary-driving motor 30M. In other words, if the cable guide 40 is provided with only a small number of the bending sections, the bending angle of each of the bending sections of the cable guide 40 wrapped around the periphery of the rotary-driving motor 30M becomes narrow. This may increase the degree of curvature of the cables in each bending section, and may thus result in breakage of the cables. Accordingly, the number of the bending sections in the cable guide 40 may be determined in view of the size of the rotary-driving motor 30M and the degree of curvature of the cables in each bending section when the cable guide 40 is wrapped around the periphery of the rotary-driving motor 30M. Preferably, the number of the bending sections is set such that the cable guide 40 substantially forms a circular-arc around the periphery of the rotary-driving motor 30M.

The technical scope of the present invention is not limited to the above embodiments, and modifications are permissible within the scope and spirit of the present invention.

What is claimed is:

1. A tiltable-rotatable circular-table device for a machine tool, which includes a main frame; a tiltable table having a tilting shaft via which the tiltable table is axially supported on the main frame; a circular table rotatably disposed on the tiltable table; a tilt-driving motor which is disposed in the main frame and is provided for tilting the tiltable table via the tilting shaft; a rotary-driving motor which is fixed to the tiltable table and is provided for rotating the circular table; a motor cover which is fixed to the main frame and is provided for housing the rotary-driving motor; and cables connected with the rotary-driving motor, the tiltable-rotatable circular-table device comprising:

a cable guide which is housed in the motor cover and is capable of surrounding at least a portion of a periphery of the rotary-driving motor so as to guide the cables in a direction in which the cables extend, one end of the cable guide being fixed to an inner surface of the motor cover, the other end of the cable guide being fixed on the periphery of the rotary-driving motor, wherein the cable guide is bendable mainly in a thickness direction of the cable guide at multiple sections thereof such that the cable guide is capable of surrounding the rotary-driving motor.

2. The tiltable-rotatable circular-table device for a machine tool according to claim 1, wherein the cable guide includes a plurality of guide components rotatably linked with each other, and wherein each guide component is rotatable with respect to one of two adjacent guide components in one direction from a linearly-linked state.

3. The tiltable-rotatable circular-table device for a machine tool according to claim 2, wherein each guide component is provided with a plurality of separated internal spaces through which the cables extend.

* * * * *